United States Patent [19]

Hamann

[11] 4,062,295
[45] Dec. 13, 1977

[54] EMERGENCY SLIPPER FOR HIGH-SPEED VEHICLES

[75] Inventor: Lutz Hamann, Olching, Germany

[73] Assignee: Maschinenfabrik Augsburg-Nurnberg Aktiengesellschaft, Munich, Germany

[21] Appl. No.: 710,814

[22] Filed: Aug. 2, 1976

[30] Foreign Application Priority Data

Aug. 16, 1975 Germany ............................ 2536575
Aug. 16, 1975 Germany ............................ 2536574

[51] Int. Cl.² .......................... B61H 7/06; B61B 13/08
[52] U.S. Cl. .................................. 104/279; 104/259; 105/216
[58] Field of Search ............... 104/1 R, 1 A, 148 MS, 104/134, 259, 279, 280; 105/216, 217; 291/1; 15/236 R, 237, 246, 256.5

[56] References Cited

U.S. PATENT DOCUMENTS

| 556,723 | 3/1896 | Kneedler | 105/216 |
|---|---|---|---|
| 2,718,654 | 9/1955 | Draughn | 15/236 R |
| 2,864,318 | 12/1958 | Toulmin, Jr. | 104/1 A |
| 2,942,557 | 6/1960 | Hirsch et al. | 104/134 |
| 2,988,833 | 6/1961 | Preston | 15/54 |

FOREIGN PATENT DOCUMENTS

| 912,226 | 5/1954 | Germany | 105/216 |
|---|---|---|---|
| 837,568 | 6/1960 | United Kingdom | 104/279 |

*Primary Examiner*—Albert J. Makay
*Assistant Examiner*—Carl Rowold
*Attorney, Agent, or Firm*—Alan H. Levine

[57] ABSTRACT

An emergency slipper of the type usually spaced above a track but which comes into sliding engagement with the track in an emergency. The slipper comprises slide blocks having bottom surfaces which slide easily along the track, and scraper means for scraping rust, dirt, ice, and the like for the track. The scraper means may be a vertical scraper plate arranged diagonally with respect to the direction of travel, the slipper having a diagonal groove directly in front of the scraper plate. The scraper means may be a scrubbing block arranged as the first slide block of the slipper, the scrubbing block being formed of an impact and abrasion resistant material with a low coefficient of friction and high resistance to high temperatures produced by friction. The rear block of the slipper may be formed of the same material as the scrubbing block. The scrubbing block may have a diagonal groove in its bottom surface. The front block may have an inclined surface between its front and bottom faces.

11 Claims, 5 Drawing Figures

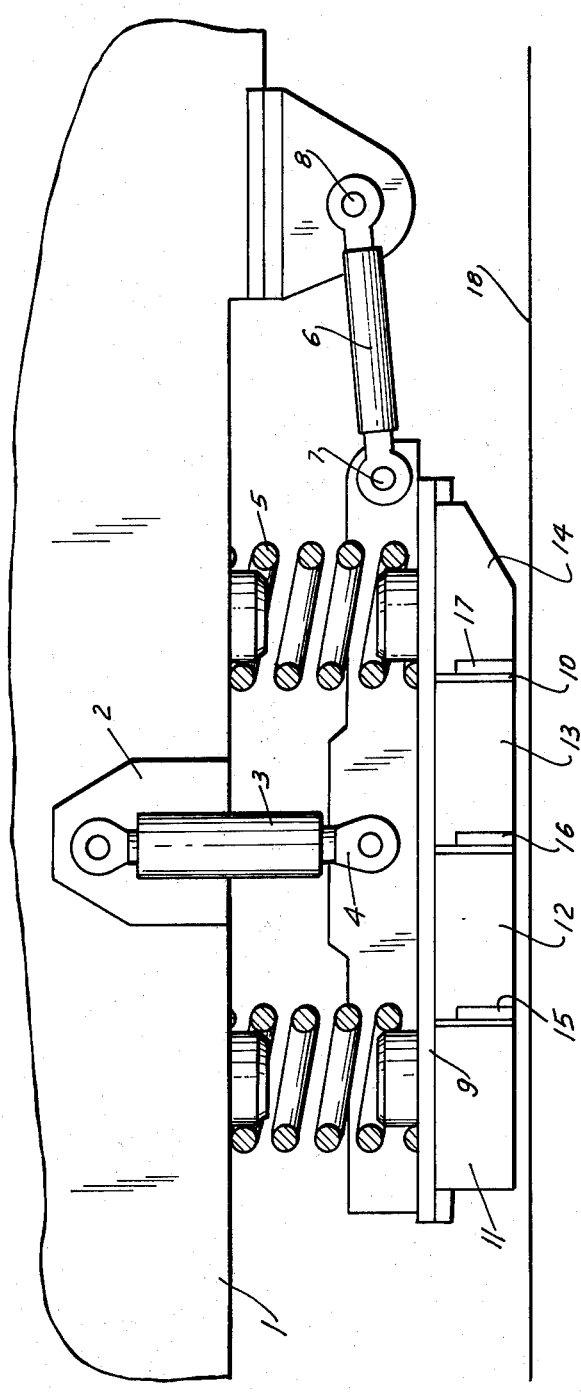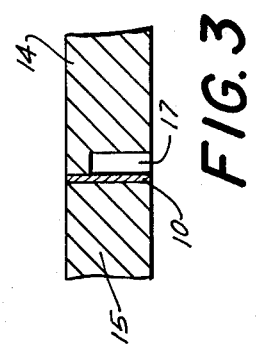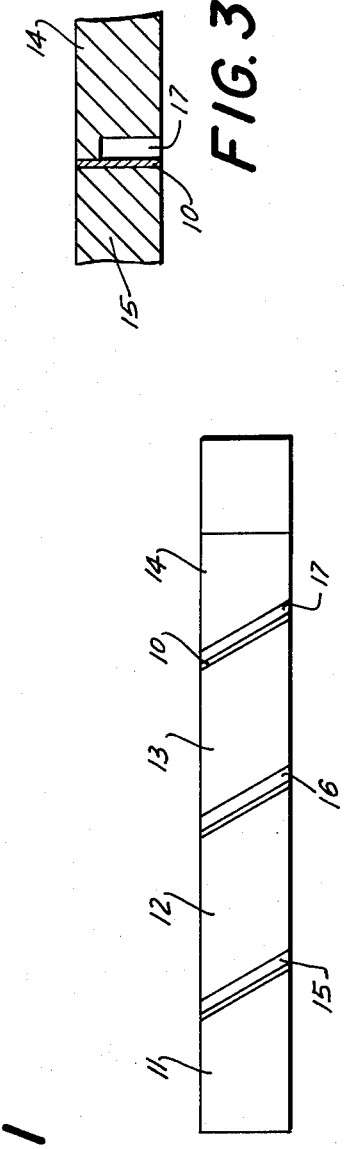

EMERGENCY SLIPPER FOR HIGH-SPEED VEHICLES

The invention relates to an emergency slipper for high-speed vehicles, such as trains, the slipper being provided with slide blocks for sliding on a track.

In the case of high-speed vehicles with magnetic support and guide means, i.e., vehicles supported and guided by magnetic fields, emergency support and guide systems are necessary, so that in the event of a failure of the magnetic support or guide system these vehicles can slide without being damaged.

In such an emergency system, the vehicles slide, for example, on a steel track, and a problem arises since the surface conditions of the steel track may vary considerably.

Normally the high-speed vehicle is suspended above such a steel track, and since the track is provided solely for an emergency situation, the track surface is not used at all for a long time. As a result the track surface is allowed to collect rust or dirt, for instance bird excrement, and the surface may at times be covered with ice.

It has now become apparent that the sliding materials used thus far for such emergency slippers are very susceptible to serious damage by the aforementioned surface conditions of the steel track, which may substantially impair the effectiveness of the sliding materials of the emergency slippers.

Accordingly, the object of the invention is to provide means whereby the aforesaid disadvantages are practically entirely eliminated, and more specifically to provide in emergency slippers of the type mentioned above means for reducing wear and tear as well as the coefficient of friction between slipper and track.

Using as a basis an emergency slipper of the above-indicated type, this object is attained according to the invention by combining with the usual slide block or blocks of the emergency slipper means for scraping the steel track as the slipper slides over it.

In one embodiment of the invention, between each two successive slide blocks of the slipper there is provided a scraper plate which is disposed diagonally with respect to the direction of travel, and in front of each of which there is provided a corresponding diagonal groove in the sliding material.

Preferably, these scraper plates are pressed into the sliding material of the slide block. The purpose of the scraper plates according to the invention is to scrape off rust, dirt, and the like from the steel track, so that the wear of the slipper is kept low and the friction coefficient of the slipper remains low as well.

According to another form of the invention, each diagonal groove is located, with respect to the direction of travel, on the rear side of a slide block, and each scraper plate is located against the front side of the slide block immediately following it, thus confining the diagonal groove to that location. These channels or diagonal grooves in front of the scraper plates serve to move the scraped-off matter to the side. Because of its abrasive qualities, this hard material which is scraped off would otherwise have a very disturbing effect between the slipper and the track. However, such disadvantages are entirely avoided by the present invention.

According to a further feature of the invention, the front slide block has its front face inclined with respect to the track. As a result, the emergency slipper can better withstand the stresses when going over rail or track joints.

According to another embodiment of the invention, the scraper plates may or may not be present and the front slide block is a scrubbing block consisting of an impact and abrasion resistant material with a low friction coefficient and high frictional temperature resistance. It is for instance possible to use a pearlitic cast iron (spheroidal graphite cast iron) as material for the scrubbing block. In an emergency situation the scrubbing block ensures that material causing an undesired roughness is removed from the track, so that the slide blocks following the scrubbing block will not be damaged.

According to another form of the invention it is advantageous to provide the emergency slipper with a counter block located, with respect to the direction of travel, behind the slide blocks. This counter block preferably consists of the same material as that of the scrubbing block.

According to another embodiment of the invention, the surface of the scrubbing block facing the track is provided with at least one groove for removing the dirt. It is an advantage if this groove is located in the scrubbing block diagonal to the line of travel of the emergency slipper.

As a result of the construction of the emergency slipper in accordance with the invention, the scrubbing block scrapes off rough dirt from the track, and for example the thickest rust formations are ground off and removed by the dirt groove which is diagonal to the line of travel.

The result of a balanced bearing-surface distribution of sliding material in relation to the material used for the scrubbing and counter blocks is that the amounts of scraped-off dirt are equal and thus an optimum cleaning effect is obtained. Moreover, the arrangement of scrubbing and counter blocks prevents an undesired tilting to the side of the emergency slipper and, in addition, prevents a dislocation at the edges and a cracking of the sliding material of the slide blocks.

For a fuller understanding of the invention reference is made to the accompanying drawings which show examples of the respective embodiments.

In the drawings:

FIG. 1 is a schematic side view of an emergency slipper system for high-speed vehicles;

FIG. 2 is a bottom view of the emergency slipper system of FIG. 1;

FIG. 3 is a fragmentary view of a part of FIG. 1;

Figure 4:
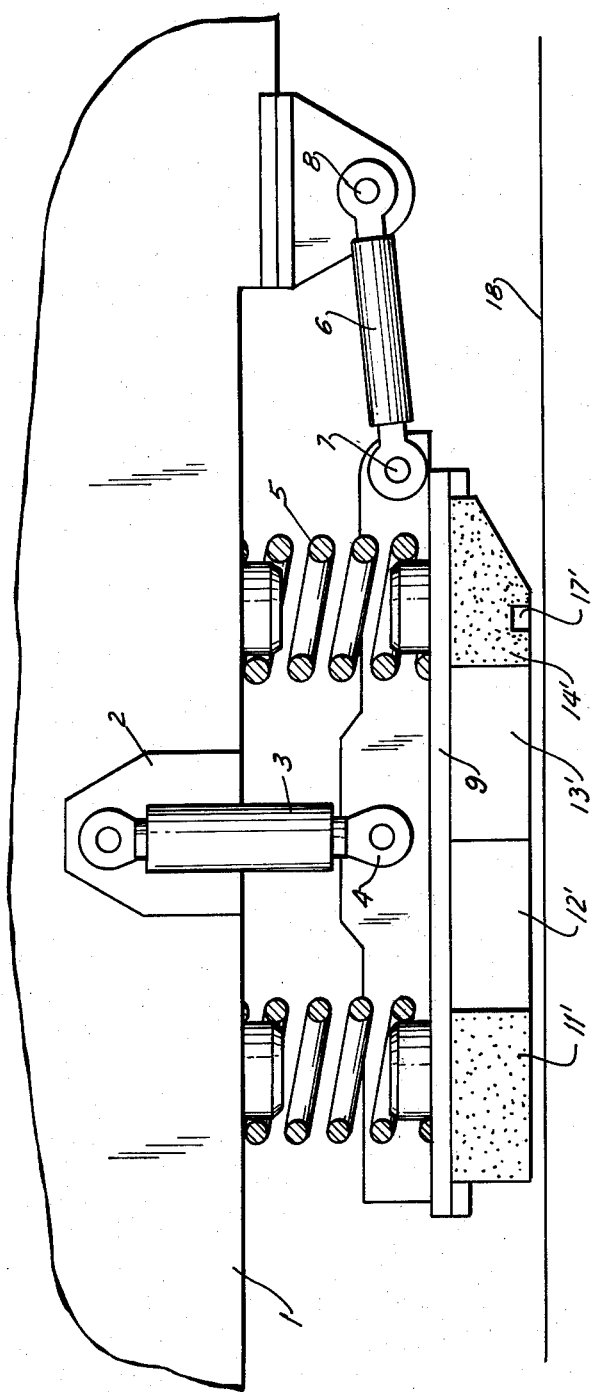
FIG. 4 is a schematic side view of an alternative embodiment of an emergency slipper system.

In FIG. 1 the numeral 1 very generally refers to the body of a high-speed vehicle, the associated magnetic support and guide systems not being shown for simplicity.

The emergency slipper, generally referred to by the numeral 9, is disposed underneath the body 1. Springs 5 are disposed between the emergency slipper 9 and the vehicle body 1. In addition, there is provided between the emergency slipper 9 and the vehicle body 1 a shock absorber 3 which at one end is connected to the vehicle body 1 by way of an attachment 2 and at the other end to the emergency slipper 9 by way of an attachment 4. Between the emergency slipper 9 and the vehicle body 1 there is also provided a link 6 having at one end an attachment 7 to the emergency slipper 9 and at the other end an attachment 8 to the vehicle body 1. The link 6 and the attachment 8 oppose the frictional forces created when the emergency slipper encounters the track 18, and hence stabilize the slipper.

On the side of the emergency slipper 9 facing the track 18 there are provided slide blocks 11, 12, 13, 14 which are normally suspended above the track 18. Between each two successive slide blocks 11/12, 12/13 and 13/14, there is provided a scraper plate 10, arranged diagonally relative to the line of travel, and in front of eac plate 10 a corresponding diagonal groove 15, 16, 17 is cut into the slide blocks. The diagonal arrangement of the channels or grooves 15, 16 and 17, which serve to move the scraped-off material to the side, is apparent from FIG. 2. Preferably, the scraper plates 10 are pressed into the sliding material of the slide blocks 11, 12, 13 and 14.

As is further apparent from the drawings, the diagonal groove 15, 16 17 is cut from the rear side of each slide block, e.g., slide block 14, while each scraper plate 10 is located on the opposite face of the slide block immediately following, e.g., slide block 13, thus confining the diagonal groove, e.g. the diagonal groove 17 to that location, as is apparent from FIG. 3.

As is also clear from FIG. 1, the front end of the first slide block 14 is inclined with respect to the track 18. The first slide block 14 may be a scrubbing block made of an impact and abrasion resistant material with a low coefficient of friction and high temperature resistance. Furthermore, the rear slide block 11 may be a counter block made of the same material as scrubbing block 14.

Figure 5:
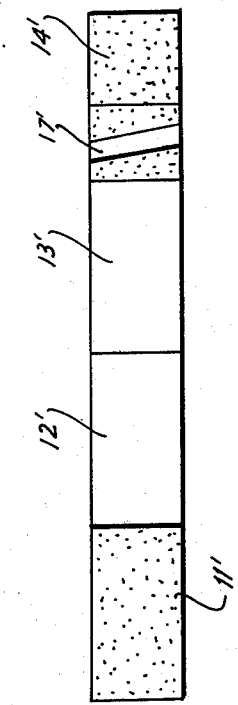
FIG. 5 is a bottom view of the emergency slipper system of FIG. 4.

In the alternative embodiment shown in FIGS. 4 and 5, the same reference numerals are used to identify the same parts as are shown in FIG. 1. In this embodiment, no scraper plates are employed. Instead, cleaning of track 18 is accomplished solely by scrubbing block 14' or by scrubbing block 14' and counter block 11'.

On the side of the emergency slipper 9 facing the track 18 there are provided slide blocks 12' and 13' made of a suitable sliding material. The emergency slipper 9 is provided with a scrubbing block 14' disposed, with respect to the direction of travel, in front of the slide blocks 12 and 13. The scrubbing block 14' has its front face inclined with respect to the track 18. This ensures that the emergency slipper system remains relatively unaffected when going over rail or track joints.

In addition, the emergency slipper 9 is provided with a counter block 11' located behind the slide blocks 12 and 13. Both the scrubbing block 14' and the counter block 11' preferably consist of an impact and abrasion resistant material with a low friction coefficient and high frictional temperature resistance.

As is particularly apparent from FIG. 5, the surface of the scrubbing block 14' facing the track 18 is provided with a groove 17' which serves to remove the dirt and whose position is diagonal to the line of travel of the emergency slipper 9. If needed, several such dirt-removing grooves 17' may be provided. Preferably, the dirt groove is located at an obtuse angle with respect to the line of travel.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

What is claimed is:

1. An emergency slipper for a high speed vehicle, the slipper being of the type which is normally spaced above a track but which comes into sliding engagement with the track in an emergency situation, the slipper comprising:
    a. slide means having a bottom surface for engaging and sliding easily along the track, said slide means comprising a plurality of slide blocks aligned in the longitudinal direction of the track,
    b. a scraper plate between each two successive slide blocks for engaging and scraping the surface of the track, and
    c. a groove directly in front of each scraper plate, said groove being located in the rear face of a slide block and its respective scraper plate being arranged against the front face of the next succeeding slide block.

2. An emergency slipper as defined in claim 1 wherein said scraper means includes a scraper plate arranged in a substantially vertical plane.

3. An emergency slipper as defined in claim 1 wherein each groove extends across the entire width of the slide blocks.

4. An emergency slipper as defined in claim 1 wherein said groove and scraper plate are parallel to each other and both are arranged diagonally with respect to the direction of travel of the slipper.

5. An emergency slipper as defined in claim 1 wherein the front slide block has an inclined surface extending between its front and bottom surfaces.

6. An emergency slipper as defined in claim 1 wherein the front slide block is a scrubbing block formed of an impact and abrasion resistant material having a low coefficient of friction and high resistance to high temperatures produced by friction.

7. An emergency slipper as defined in claim 6 including at least three slide blocks, the rear block being a counter block formed of the same material as the front scrubbing block.

8. An emergency slipper for a high speed vehicle, the slipper being of the type which is normally spaced above a track but which comes into sliding engagement with the track in an emergency situation, the slipper comprising:
    a. slide means having a bottom surface for engaging and sliding easily along the track, said slide means comprising at least one slide block,
    b. scraper means having a bottom surface for engaging and scraping the surface of the track, said scraper means comprising a scrubbing block in front of said slide block, said scrubbing block being formed of an impact and abrasion resistant material with a low coefficient of friction and high resistance to high temperatures produced by friction, and
    c. a groove in the lower surface of said scrubbing block.

9. An emergency slipper as defined in claim 8 including a counter block behind said slide block, said counter block being formed of the same material as said scrubbing block.

10. An emergency slipper as defined in claim 8 wherein said groove is arranged diagonally with respect to the direction of travel of the slipper.

11. An emergency slipper as defined in claim 8 wherein said scrubbing block has an inclined surface extending between its front and bottom surfaces.

* * * * *